United States Patent [19]
Botcherby et al.

[11] 4,170,397
[45] Oct. 9, 1979

[54] VIBRATILE OPTICAL BORESIGHT

[75] Inventors: Stephen C. L. Botcherby, Dorking; Jeremy A. Fitzherbert, Shepperton, both of England

[73] Assignee: Decca Limited, London, England

[21] Appl. No.: 859,967

[22] Filed: Dec. 12, 1977

[30] Foreign Application Priority Data

Dec. 16, 1976 [GB] United Kingdom ............... 52654/76

[51] Int. Cl.² ............................................. G02B 27/17
[52] U.S. Cl. ...................................... 350/6.3; 350/285
[58] Field of Search ................... 350/6.3, 6.2, 6.6, 6.1, 350/285, 247, 269; 358/205

[56] References Cited

U.S. PATENT DOCUMENTS

| | | | |
|---|---|---|---|
| 1,702,195 | 2/1929 | Centeno | 350/6.6 |
| 3,011,124 | 11/1961 | Hermann et al. | 358/205 |
| 3,146,367 | 8/1964 | McNaney | 350/269 |
| 3,156,759 | 11/1964 | Collen | 350/6.6 |

Primary Examiner—Jon W. Henry
Attorney, Agent, or Firm—Cushman, Darby & Cushman

[57] ABSTRACT

A vibratile optical boresight which can be used for conical or nutating scanning of a target by a beam of light. A lens is mounted for vibration, in at least one direction in a plane normal to the axis of the lens, between the free ends of piezo-electric cantilevered plates which are trihedral, tapering towards the free ends. The lens is carried in a canister which has arms extending to the cantilevers. The arms and the cantilevered plates can flex in a common plane to which the axis is normal.

9 Claims, 4 Drawing Figures

VIBRATILE OPTICAL BORESIGHT

FIELD OF THE INVENTION

This invention is a vibratile optical boresight which may be used to produce rapid and cyclic variation of a line of sight in an optical scanning system.

BACKGROUND OF THE INVENTION

Reference may be made to the article by Ahmed Erteza in "Applied Optics" Volume 15, No. 3 (March 1976) pages 656 to 660 for a description of automatic optical boresighting and an example of a system in which the present invention might be used.

SUMMARY OF THE INVENTION

In a vibratile optical boresight according to the invention there is an objective such as a lens which is mounted for vibration, in a plane normal to its axis, between the free ends of at least two piezo-electric cantilevers which extend away from the objective in spaced apart directions in the said plane. Preferably each cantilever tapers towards its free end and in preferred embodiments of the invention each cantilever is a substantially trihedral plate and is mounted in a plane normal to the said plane of vibration. The objective, which would normally be a lens but might be a mirror, may be carried in an annular canister having two opposite arms which extend to the free ends of the cantilevers and can flex in said plane.

In order to permit vibration of the mirror in two orthogonal directions in the said plane of vibration, there may be two pairs of piezo-electric cantilevers, the directions in which the cantilevers of one pair extend being at right angles to the direction in which the cantilevers of the other pair extend. The lens may be consequently supported with respect to the cantilevers by means of four arms which extend away from a holder for the objective to a respective cantilever.

Alternatively there may be three cantilevers disposed at 120° intervals about the axis of the objective.

DESCRIPTION OF THE PREFERRED EMBODIMENTS

Figure 1:
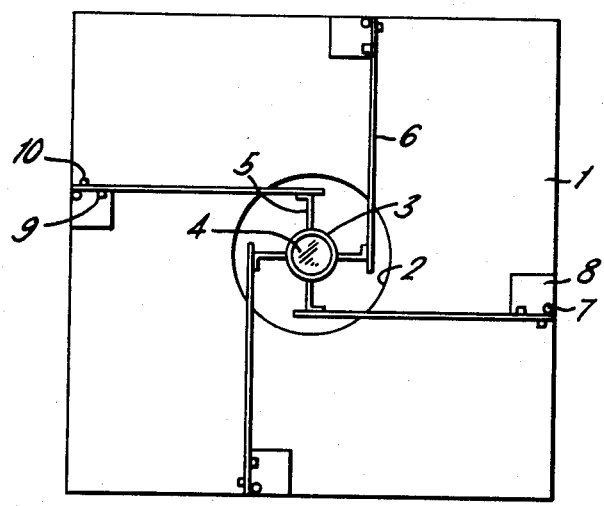
FIG. 1 is a plan view of one embodiment of a vibratile optical boresight.

The boresights which are shown in the drawings are primarily intended for use in a projector which projects a beam of light towards a target and which is intended to provide a conical movement of the projected beam. For this purpose the projector would normally include a source, such as a laser, of light and an optical system by means of which the beam is focussed and which includes a lens which can be vibrated in a plane normal to its axis. The movement of a lens in that manner in such a system is known to be capable of producing either a nutating scan of a target by the beam which is projected or a conical scan, according as the vibration is in one direction or two directions respectively. A partly spherical or parabolic mirror might be used for a similar purpose but in general the use of a lens is preferable.

Figure 2:
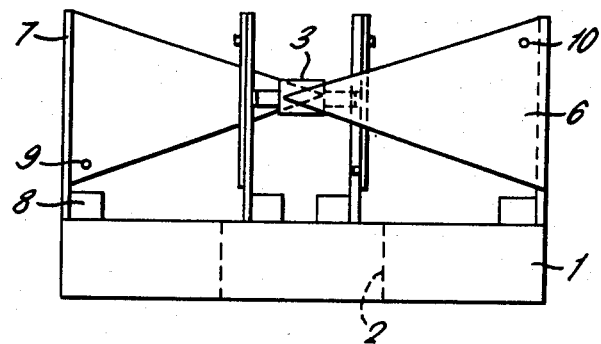
FIG. 2 is a side elevation of the boresight.
Figure 3:
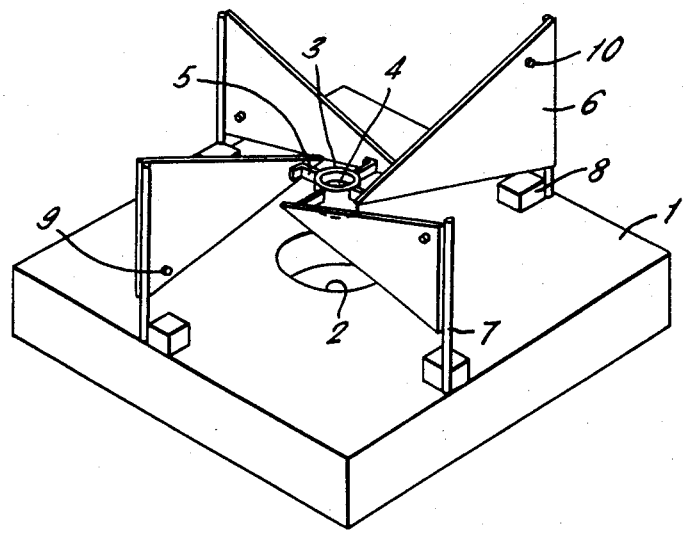
FIG. 3 is an isometric view of the boresight.

The boresight which is shown in FIGS. 1 to 3 of the drawings is mounted on a square base plate 1 which has a central circular aperture 2, centrally above which is a short cylindrical canister serving as a holder for a doubly convex lens 4 of which the optical axis is perpendicular to the base plate and centrally through the aperture 2. This disposition of the lens permits the source of light to be mounted behind the base plate and for the beam which is to be projected to pass through the base plate to reach the lens 4. In this embodiment the canister 3 has four arms 5 which extend away to the free ends of four piezo-electric cantilevers 6. The cantilevers are in two pairs, each pair being able to flex in the desired plane of vibration of the lens, to which plane the axis of the lens is normal. The cantilevers in each pair are disposed one to each side of the lens and extend in opposite directions in two spaced apart parallel planes. Each cantilever is a substantially trihedral plate. The respective connecting arm 5 is attached, for example by adhesive, to a place near the apex of the cantilever. The base of each cantilever is mounted upright with respect to the base 1. Along the base of each cantilever is an upright post 7, to which the base of the cantilever may be secured by a suitable adhesive. Each post 7 is secured by an adhesive to a small respective block 8 which is riveted to the base plate and which has a part cylindrical circular recess formed at one vertical edge to accommodate the respective post 7. Each cantilever is, as already mentioned, of piezo-electric material. It may be made for example of barium zirconium titanate. It carries two electrodes 9 and 10, one on each broad face of the respective cantilever. The position of each electrode is generally unimportant provided that there is one on each broad face of the cantilever and the electrodes are near the base of the cantilever.

Normally each pair of cantilevers would be supplied with alternating electric current signals which are an anti-phase so that the cantilevers in each pair flex to and fro in unison to vibrate the lens in its plane normal to its axis. The pairs of cantilevers may be fed with signals that differ in phase and are preferably in quadrature so as to move the axis of the objective 4 circularly. If, as would normally be so, the direction of the beam which is projected through the aperture 2 is parallel to the axis of the lens the movement of the lens produces conical scanning of the beam.

The trihedral shape of the cantilevers facilitates the secure support of the cantilevers; moreover, they flex more readily than a prismatic bar of constant cross-section; the resonant frequency of each cantilever may consequently be comparatively high and the objective may be vibrated at comparatively high frequencies.

Each of the four arms 5 by which the lens is supported on the cantilevers may be longitudinally rigid but able to flex laterally in the plane of vibration. Conveniently each arm is in the form of a leaf spring (as shown). Accordingly the movement of the lens by one pair of cantilevers has substantially no effect on the other pair of cantilevers and the movement of the lens in its two vibratile directions can thereby be substantially independent at least for the ordinary range of movement for which the device is intended.

If only a nutating scan were required one of the pairs of cantilevers and the associated arms 5 could be omitted but the additional freedom of movement which is thereby afforded to the mirror is of no substantial benefit in producing a nutating scan and in general it would be preferable, if such a scan were required, merely to energise one pair of cantilevers, the unenergised cantilevers then serving as resilient supports which inhibit movement of the lens transverse its direction of vibration.

Figure 4:
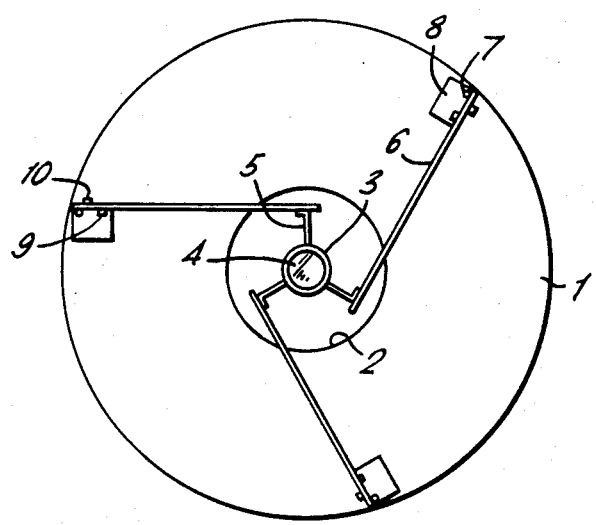
FIG. 4 is a plan view of another embodiment of the boresight.

FIG. 4 is a plan of another embodiment, which is generally similar to that already described except that it has a circular base and there are three cantilevers, spaced apart at 120° intervals, instead of four. This embodiment can be used to provide either nutating scanning or conical scanning by appropriate selection of the relative amplitudes and phases of the alternating voltages applied to the cantilevers' electrodes.

In a specific embodiment, the cantilevers are 20 mm long; each has a base 15 mm wide.

We claim:

1. A vibratile optical boresight comprising an optical objective having an optical axis; means for causing vibration of said objective in a plane wholly normal to said axis, said means comprising a plurality of piezoelectric cantilevers each having a free end adjacent the objective and a fixed end remote from the said objective, the cantilevers being disposed to flex in a said plane to which the said axis is normal, said cantilevers extending in said plane away from said objective in angularly spaced directions offset from said optical axis; and means for mounting the said objective to the free ends of the cantilevers.

2. A boresight according to claim 1 in which there is at least one pair of cantilevers which comprise plates disposed in two parallel planes each of which is normal to the said plane to which the said axis is normal.

3. A boresight according to claim 2 in which there are two pairs of cantilevers, one pair being disposed orthogonally to the other.

4. A vibratile optical boresight comprising a lens which is mounted for vibration, in two orthogonal directions lying in a plane normal to the axis of the lens, between the overlapping free ends of each of a respective pair of piezo-electric cantilevers which are in the form of plates that taper towards their free ends and are mounted in spaced apart planes normal to the plane of vibration of the lens, the pairs of cantilevers being at right angles to each other, and an electrode on each broad face of each cantilever.

5. A boresight according to claim 4, in which the lens is carried by a canister which has four arms, which extend at right angles each to a respective cantilever and which are capable of flexing in the said plane of vibration.

6. A vibratile optical boresight comprising:
   an optical objective having an optical axis; a plurality of piezoelectric cantilevers each having a free end adjacent the objective and a fixed end remote from the said objective and each cantilever tapering towards its free end, the cantilevers being disposed to flex in a common plane to which the said axis is normal; and means for mounting the said objective to the free ends of the cantilevers.

7. A vibratile optical boresight comprising: an optical objective having an optical axis; a plurality of piezoelectric cantilevers each having a free end adjacent the objective and a fixed end remote from the said objective, each cantilever being a trihedral plate disposed in a plane normal to a common plane to which the said axis is normal, the cantilevers being disposed to flex in said common plane; and means for mounting the said objective to the free ends of the cantilevers.

8. A boresight according to claim 7 in which there are three of the said cantilevers, which are disposed in planes normal to the said common plane and are spaced apart about the said optical axis.

9. A vibratile optical boresight comprising: an optical objective having an optical axis; at least two piezoelectric cantilevers each of which has a free end adjacent the objective and a fixed end remote from the objective, each cantilever comprising a plate which is disposed in a plane normal to a common plane to which the said axis is normal, the cantilevers being thereby disposed to flex in said common plane; and means for mounting the objective to the free ends of the cantilevers, said means comprising a plurality of arms each of which can flex in said common plane and extends outwardly from said objective to the free end of a respective cantilever.

* * * * *